(No Model.)
J. MASON.
METHOD OF AND APPARATUS FOR HEATING CARS.
No. 271,885. Patented Feb. 6, 1883.
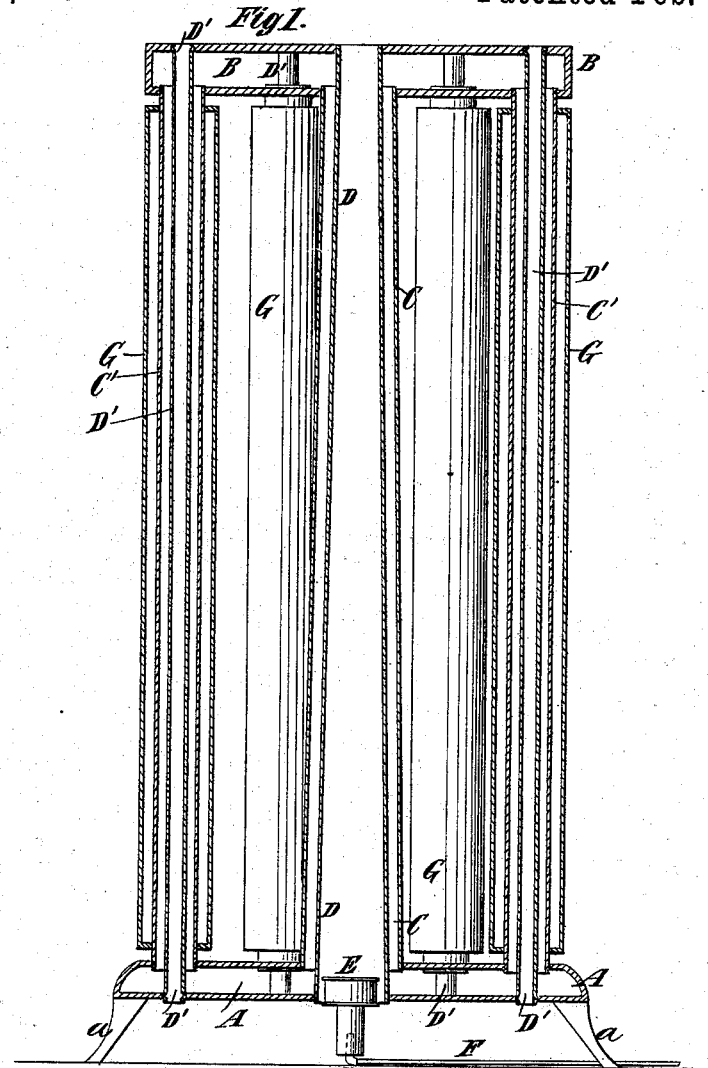
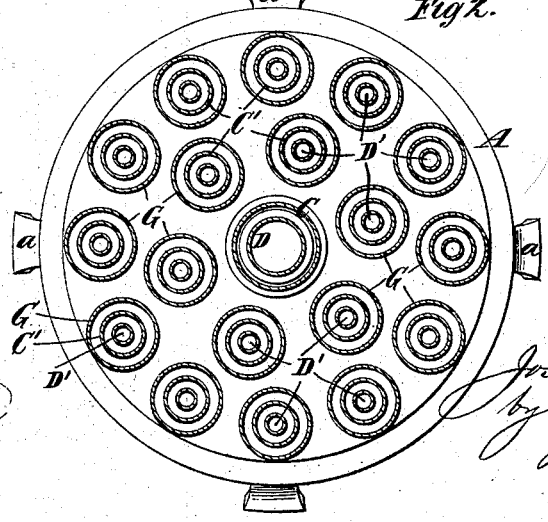

UNITED STATES PATENT OFFICE.

JOSHUA MASON, OF PATERSON, NEW JERSEY.

METHOD OF AND APPARATUS FOR HEATING CARS.

SPECIFICATION forming part of Letters Patent No. 271,885, dated February 6, 1883.

Application filed June 15, 1882. (No model.)

*To all whom it may concern:*

Be it known that I, JOSHUA MASON, of Paterson, in the county of Passaic and State of New Jersey, have invented certain new and useful Improvements in the Method of and Apparatus for Heating Cars, of which the following is a specification.

Although my invention is intended more particularly for heating railway-cars, it is also applicable for heating other apartments.

My invention relates more particularly to the method of heating by means of substances—such as acetate of soda—which possess a high degree of latent heat of fusion, so that after being liquefied they will give off not only their sensible caloric, but also the latent caloric of fusion; but my improved apparatus is also applicable in part for the purpose of heating by hot water or other liquid alone. Where substances of the kind above referred to are employed in heating, they may be advantageously confined or contained in air-tight vessels or receptacles; and an important object of my invention is to prevent the said substance from becoming accidentally heated to such a degree that it will be vaporized and produce a pressure sufficient to burst the vessels or receptacles which contain it.

To this end my invention consists in an improvement in the method of heating by a substance which possesses a high degree of latent heat of fusion, said improvement consisting in heating and thereby producing the circulation of a liquid medium which boils at a lower temperature than the substance employed, and in effecting the liquefaction of said substance by means of the circulating medium, whereby I prevent the said substance from being heated to a temperature higher than the boiling-point of said circulating medium, which is lower than the boiling-point of said substance.

The invention likewise consists in the combination, in a single structure or apparatus, of tubes or conduits providing for the circulation of a liquid, a heating device for producing such circulation, and jackets or receptacles containing a fusible substance of the kind above described, arranged to provide for the heating of said substance by the circulating liquid.

The invention also consists in the combination of upper and lower heads or chambers, circulating-tubes connecting them and providing for the circulation of liquid from one to the other of said heads or chambers, jackets surrounding said circulating-tubes and containing a substance which possesses a high degree of latent heat of fusion, air-tubes extending through said circulating-tubes and said heads or chambers, and a heating device arranged in or below one of said air-tubes.

The invention also consists in details of construction hereinafter described and claimed.

In the accompanying drawings, Figure 1 represents a central vertical section of a heating apparatus embodying my invention; and Fig. 2 represents a horizontal section thereof.

Similar letters of reference designate corresponding parts in both figures.

A B designate respectively lower and upper hollow heads or chambers, adapted to contain a liquid—such, for instance, as water—and the former of which is provided with legs or feet *a*, on which it is supported. The heads or chambers are here shown as circular; but they may be of any other form.

C designates a central tube extending from the upper side of the lower head or chamber, A, to the under side of the upper head or chamber, B; and C' designates similar tubes, each forming a separate communication between the two heads or chambers, and arranged or grouped in circular series around the central tube, C.

D designates a tube arranged centrally within the tube C, and extending from the lower side of the lower head or chamber, A, to the upper side of the upper head or chamber, B, or, in other words, extending through the tube C and also through the two heads or chambers; and D' designates other tubes similar to the tube D, and extending in like manner, one through each of the tubes C' and also through the heads or chambers.

The tubes C C' D D' may be fixed in the heads or chambers A B in any suitable manner. They may, for instance, be expanded into suitable tube-holes in the walls of the two heads or chambers, as here shown. The difference in expansion between each tube C or C' and its concentric or inner tube, D or D', might possibly produce leakage, and to prevent this I may connect the tubes D D' at one end to the head or chamber A or B, by means of elastic or flexible nuts like those which form the subject of United States Letters Patent No. 153,776, granted to me August 4, 1874. Each of the tubes D D′ is open to the atmosphere at both ends, and forms an air-tube through which air may circulate upward, and between each tube D and D′ and its surrounding tube C or C′ is formed an annular space which forms a conduit for establishing communication between the heads or chambers. Hence I may term the tubes C C′ "circulating-tubes."

It will be observed that the tubes C and D are considerably larger than the tubes C′ D′, and that in or below the tube D, I arrange a burner, E, which may be supplied with gas by a pipe, F; or a heating device of other form may be used.

From the above description it will be readily understood that the burner or heating device, when in operation, will heat the tube D, and the liquid in the annular space surrounding it, and if the tubes C C′ and both heads or chambers be filled with liquid—such as water—a rapid upward circulation will be produced in the tube C, and a downward circulation in the tubes C′.

The apparatus so far as described is complete, if the heating is to be effected by hot water simply; but I preferably surround each tube C′ by a jacket or receptacle, G, into which I introduce acetate of soda, or any analogous substance which may be liquefied by heat and which possesses a high degree of latent heat of fusion which it gives off in solidifying. After the jackets or receptacles are thus filled they may be tightly closed by soldering or otherwise.

I fill the heads or chambers A B and connecting-tubes C C′ with a liquid which will boil at a less temperature than the acetate of soda or analogous substance, and I preferably employ a liquid which will not freeze. Water alone may be used for the purpose, or water and glycerine, or any other suitable liquid.

When the burner or heating device is in use the downward circulation of the liquid through the tubes C′ will liquefy the substance contained in the jackets G, and after the liquefaction is complete the substance will give off its latent heat in solidifying. It will therefore be seen that the water or other liquid employed serves as a circulating medium through which the heat is transmitted to the substance in the jackets, and as the water or other liquid will boil at a lower temperature than the substance in the jackets, the latter can never boil or become vaporized.

If desirable, the upper head or chamber, A, may be provided with a safety-valve or escape-pipe, through which the vapor may escape if the liquid is heated to a boiling-point; but this is not intended to be done, and will seldom or never happen.

It is obvious that my improved method of liquefying the acetate of soda or analogous substance by a circulating liquid medium may be carried out in apparatus of other forms than the one here shown.

What I claim as my invention, and desire to secure by Letters Patent, is—

1. The improvement in the method of heating by a substance which possesses a high degree of latent heat of fusion, consisting in heating and thereby producing the circulation of a liquid medium which boils at a lower temperature than the said substance, and in effecting the liquefaction of said substance by means of said circulating medium, substantially as and for the purpose herein described.

2. The combination, in a single structure or apparatus, of tubes or conduits providing for the circulation of a liquid, a heating device for producing such circulation, and jackets or receptacles containing a fusible substance which possesses a high degree of latent heat of fusion, and arranged to provide for the heating of said substance by the circulating liquid, substantially as and for the purpose herein described.

3. The combination of upper and lower heads or chambers, circulating-tubes connecting them and providing for the circulation of liquid from one to the other of said heads or chambers, jackets surrounding said circulating-tubes and containing a substance which possesses a high degree of latent heat of fusion, air-tubes extending through said circulating-tubes and said heads or chambers, and a heating device arranged in or below one of said air-tubes, substantially as and for the purpose herein described.

4. The combination of the circular heads or chambers A B, the larger central circulating and air tubes, C and D, connecting them, the circulating and air tubes C′ D′, grouped in circular series around said central tubes, the jackets G, containing acetate of soda or analogous substance, and the burner E, substantially as and for the purpose herein described.

JOSHUA MASON.

Witnesses:
I. F. BOICE,
J. C. CHRISTIE.